Nov. 17, 1942.  W. B. ANDERSON  2,302,385

REFRIGERATION APPARATUS

Filed June 3, 1941  2 Sheets-Sheet 1

WITNESSES:

INVENTOR
WILLIAM B. ANDERSON.
BY
ATTORNEY

Nov. 17, 1942.  W. B. ANDERSON  2,302,385
REFRIGERATION APPARATUS
Filed June 3, 1941  2 Sheets-Sheet 2
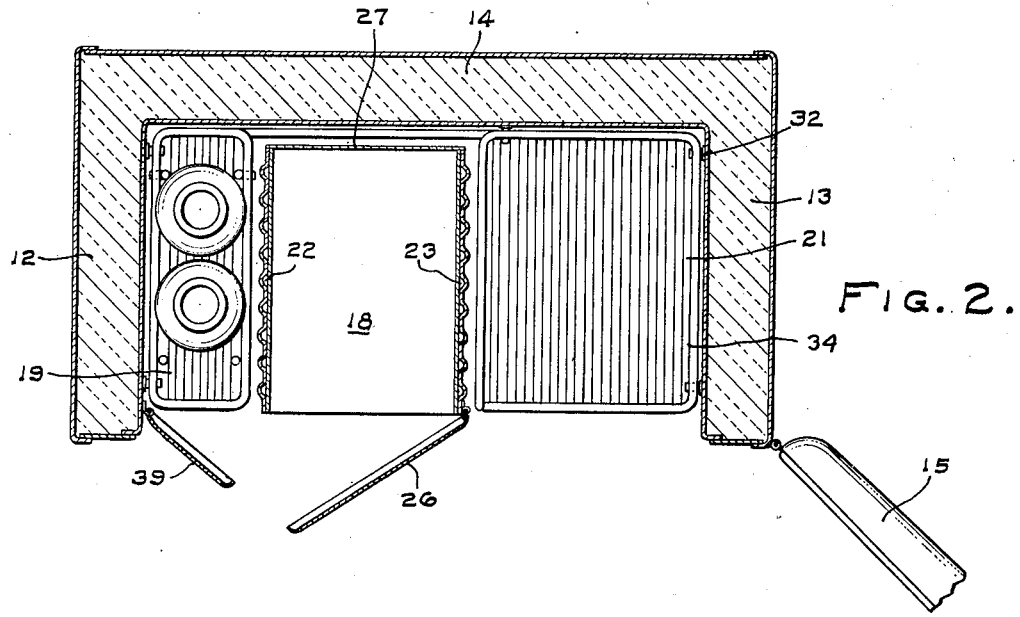
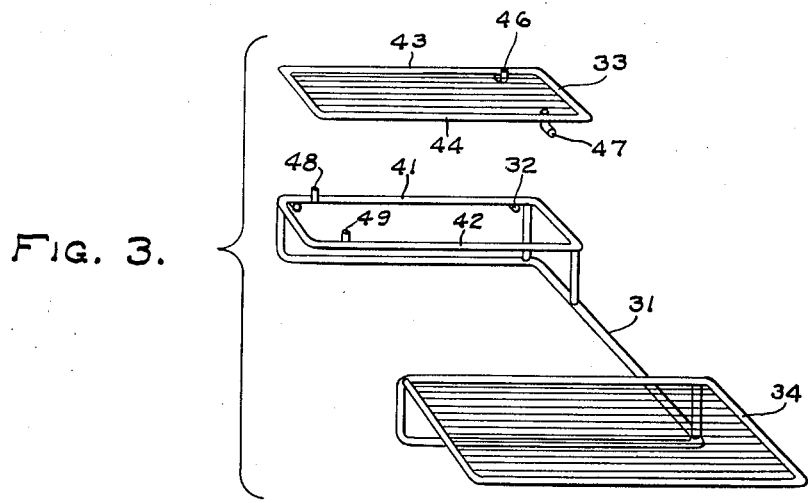
INVENTOR
WILLIAM B. ANDERSON.

Patented Nov. 17, 1942

2,302,385

UNITED STATES PATENT OFFICE 2,302,385

REFRIGERATION APPARATUS

William B. Anderson, West Springfield, Mass., assignor to Westinghouse Electric & Manufacturing Company, East Pittsburgh, Pa., a corporation of Pennsylvania Application June 3, 1941, Serial No. 396,384

5 Claims. (Cl. 62—89)

This invention relates to refrigerators and more particularly to a food storage compartment for packaged fresh milk.

The refrigerated compartment of a household refrigerator is usually maintained at an average temperature of between 40° F. and 45° F. for general refrigeration purposes. An average temperature within this range may be maintained in the refrigerated compartment by the convectional currents of air set up therein by a refrigerant evaporator located in the upper portion of the refrigerated compartment. In the usual refrigerator, this result is obtained by maintaining the temperature of the surface of the evaporator considerably below 32° F., for example, approximately 20° F. Fresh milk keeps best at a temperature slightly above freezing, and since such milk is generally kept in closed containers, it is not necessary to maintain a high humidity in the compartment where the containers are stored.

It is accordingly an object of the invention to provide a low temperature storage space in a domestic refrigerator which storage space is adapted to preserve fresh milk.

Another object of the invention is to provide a low temperature storage space for fresh milk without interfering with the temperatures maintained in the main food storage compartment.

A further object of the invention is to provide a grouping of a storage receptacle for fresh meats and a storage compartment for fresh milk in a domestic refrigerator which receptacle and compartment mutually aid one another in maintaining their respective temperatures.

These and other objects are effected by the invention as will be apparent from the following description and claims taken in connection with the accompanying drawings forming a part of this application, in which:

Fig. 2 is a section on the line II—II of Fig. 1 but with the doors of the milk storage compartment and the ice tray compartment partially open;

Fig. 3 is an exploded view in perspective of a sliding shelf of the milk storage compartment and the supporting structure for said shelf.

Figure 1:
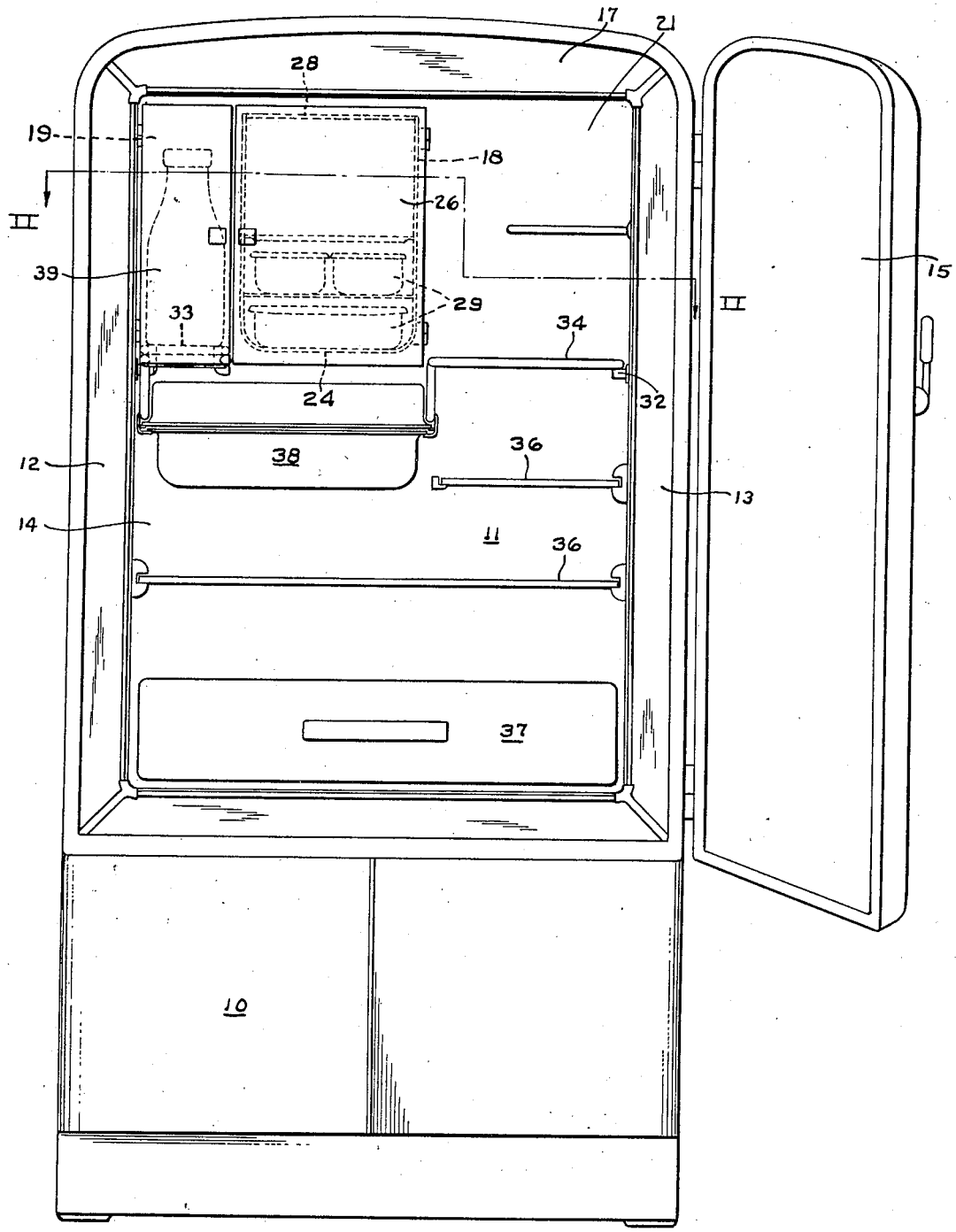
Fig. 1 is an elevation of a domestic refrigerator cabinet embodying the invention, the door of the cabinet being open.

Referring to the drawings for a detailed description of the invention, the reference numeral 10 represents a domestic refrigerator cabinet having an insulated food storage chamber 11 in the upper portion thereof. The food storage chamber 11 comprises two insulated side walls 12 and 13, an insulated rear wall 14, a door 15, and a top wall 17. An evaporative cooling unit 18 is secured in the upper portion of the food storage chamber 11 and slightly off center to define a smaller food storage space 19 to one side thereof and a larger food storage space 21 at the other side thereof.

The cooling unit 18 extends from adjacent the rear wall 14 to adjacent the door 15 of the food storage compartment 11 when the door 15 is closed and comprises a double walled U-shaped metallic structure which provides refrigerant passages at the side walls 22 and 23 and the bottom wall 24 thereof. The front opening of the U-shaped cooling unit 18 is closed by a metal door 26 and the top and the upper portion of the rear opening of the cooling unit are closed by metal walls 27 and 28, respectively. The cooling unit 18 is maintained at a temperature of about 20° F. to readily freeze water in the ice trays 29 located in the interior of the cooling unit 18. The cooling unit 18 and the cabinet 10 are furthermore designed to maintain the food storage chamber 11 at an average temperature of from 40° F. to 50° F. A shelf structure 31, supported on pins 32, provides a perforate shelf area 33 in the smaller food storage space 19 and a second perforate shelf area 34 in the larger food storage space 21. Both of said shelves 33 and 34 lie substantially in the same plane with the bottom wall 24 of the cooling unit 18. Additional shelves 36 are located in the lower portion of the food storage chamber and a closed receptacle 37 for fresh vegetables is located in the bottom thereof.

A meat storage receptacle 38 having substantially imperforate top, bottom, and side walls is located directly beneath the cooling unit 18 and extends sidewardly thereof to the side wall 12 of the food storage chamber 11, thereby substantially restricting air circulation through the perforate shelf 33 of the smaller food storage space 19. Air circulation from the food storage chamber 11 to the food storage space 19 is further restricted by a door 39 adjacent the front edge of the cooling unit 18 and extending to the side wall 12 of the food storage chamber. The food storage space 19 is of a width to accommodate milk bottles of one-quart capacity.

The food storage space 19, if not restricted as to air circulation, would be at a higher temperature than the average temperature of the food storage chamber 11 and this would not be a temperature best suited for preserving fresh milk. Without the air restricting members comprising the door 39 and the meat storage receptacle 38, the convectional air circulation in the cabinet would be upwardly in the areas of the food storage chamber adjacent the joints between the door 15 and the side walls 12 and 13, respectively, because the greatest heat leakage into the food storage chamber occurs at the areas where the door 15 seals against the food storage chamber 11. This upwardly flowing stream of air would ordinarily flow through the food storage spaces 19 and 21 to the cooling unit 18, would be cooled by said unit 18 and then pass downwardly along the rear wall 14 of the food storage chamber, and forwardly underneath the shelves 36 to the area adjacent the door 15 to repeat its cycle of circulation.

With the circulation restricted by the door 39 and by the meat storage receptacle 38, only a small portion of the warm upwardly flowing convectional air current flows through the food storage space 19. An independent local circulation of air is set up in the storage space 19 which is downwardly along the refrigerated wall 22 of the cooling unit to the portion of the meat storage chamber 38 adjacent thereto, thereafter towards the wall 12 of the food storage chamber 11, upwardly along said wall to the top wall 17 of the food storage chamber, and then to the refrigerated wall 22 to repeat the cycle just described.

This circulation of air not only maintains the food storage space 19 at a temperature below that of the average temperature of the food storage chamber 11 but also cools that portion of the meat storage receptacle 38 which lies directly below the food storage space 19. Since the temperature in the meat storage chamber 38 is preferably slightly above the freezing point of water, the additional cooling obtained through the food storage space 19 is a material aid in maintaining this temperature in the food storage receptacle 38.

The shelf 33 of the food storage space 19 may be arranged to slide so that the entire contents of the food storage space 19 may be slid forwardly with the shelf 33 to facilitate removal of bottles placed at the rear of the shelf 33. For this purpose the shelf structure 31 provides two parallel bars 41 and 42 upon which the shelf 33 is adapted to slide. The shelf 33 has two parallel bars 43 and 44 which rest on and slide upon the bars 41 and 42 respectively of the shelf structure 31. The rear portion of each of the bars 43 and 44 is provided with hook elements 46 and 47 which engage the bars 41 and 42 respectively and prevent the shelf 33 from tilting downwardly when it is pulled out. Guides 48 and 49 are secured to the parallel bars 41 and 42 respectively to retain the parallel bars 43 and 44 of the shelf 33 on the bars 41 and 42.

It will be apparent from the above that this invention provides a storage space in a domestic refrigerator which is maintained at a temperature below the average temperature of the food storage chamber of the refrigerator and is suitable for the storage and preservation of packaged fresh milk. It will further be apparent that the invention provides a grouping of a storage space for packaged fresh milk and a storage receptacle for fresh meats in such a manner that they mutually aid one another in maintaining their respective temperatures.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What is claimed is:

1. In a refrigerator, the combination of an insulated food storage chamber having a rear, side, top, and bottom wall, and a door forming at least a portion of the front wall of said food storage chamber; a cooling unit in the upper portion of said food storage chamber, said cooling unit comprising an exposed vertical refrigerated wall parallel to and spaced from said side wall of said food storage chamber and an exposed and refrigerated lower wall, said cooling unit defining a freezing compartment; a substantially imperforate food storage container located below said cooling unit and having a portion of its top wall located closely adjacent said bottom wall of the cooling unit and a second portion of its top wall extending to adjacent said side wall of the food storage chamber; and a second door, near to and substantially parallel to the door of the food storage chamber when both of said doors are closed, said second door closing the space between said refrigerated wall of the cooling unit and said last-mentioned side wall of the food storage chamber, said space being suitable for the storage of packaged milk.

2. In a refrigerator, the combination of an insulated food-storage chamber having two side walls and a rear, a top, a bottom, and a front wall, said front wall comprising a door; a cooling unit in said chamber and spaced from one of said side walls, said cooling unit having a vertical, refrigerated, and exposed wall opposite said last-named side wall, and an exposed and refrigerated bottom wall, said cooling unit defining a freezing compartment; a substantially imperforate food-storage container in said chamber, said container having a portion of its top wall located closely adjacent said bottom wall of the cooling unit and a second portion of its top wall extending to adjacent said last-named side wall of the food-storage chamber; and a second door near the front wall of the food-storage chamber and extending, when closed, between said vertical wall of the cooling unit and said last-named side wall of the food-storage chamber.

3. In a refrigerator, the combination of an insulated food-storage chamber having two side walls and a rear, a top, a bottom, and a front wall, said front wall comprising a door, a cooling unit in said chamber and spaced from one of said side walls, said cooling unit having a vertical, refrigerated, and exposed wall opposite said last-named side wall, and an exposed and refrigerated bottom wall, said refrigerated walls of the cooling unit extending substantially to the rear wall of the food-storage chamber, said cooling unit defining a freezing compartment; a substantially imperforate food-storage container in said chamber, said container having a portion of its top wall located closely adjacent said bottom wall of the cooling unit and a second portion of its top wall extending to adjacent said last-named side wall of the food-storage chamber, both of said top wall portions extending substantially to the rear wall of said food-storage chamber; and a second door, near to and substantially parallel to the door of the food-storage chamber when both of said doors are closed, said second door closing the space between said vertical wall of the cooling unit and the portion of the side wall of the food-storage chamber opposite thereto, said space being suitable for the storage of packaged milk.

4. In a refrigerator, the combination of an insulated food-storage chamber having two side walls and a rear, a top, a bottom, and a front wall, said front wall comprising a door; a cooling unit in said chamber and spaced from one of said side walls, said cooling unit having a vertical, refrigerated, and exposed wall opposite said last-named side wall, and an exposed and refrigerated bottom wall, said cooling unit defining a freezing compartment; a substantially imperforate food-storage container in said chamber, said container having a portion of its top wall located closely adjacent said bottom wall of the cooling unit but not in metallic heat-conducting contact therewith and a second portion of its top wall extending to adjacent said last-named side wall of the food-storage chamber; and a second door near the front wall of the food-storage chamber and extending, when closed, between said vertical wall of the cooling unit and said last-named side wall of the food-storage chamber, said food-storage container being cooled mainly by direct convectional air currents flowing downwardly from said cooling unit including said two refrigerated walls thereof.

5. In a refrigerator, the combination of an insulated food-storage chamber having two side walls and a rear, a top, a bottom, and a front wall, said front wall comprising a door; a cooling unit in said chamber and spaced from one of said side walls, said cooling unit having a vertical, refrigerated, and exposed wall opposite said last-named side wall, and an exposed and refrigerated bottom wall, said cooling unit defining a freezing compartment; a substantially imperforate food-storage container in said chamber, said container having a portion of its top wall located closely adjacent said bottom wall of the cooling unit but not in metallic heat-conducting contact therewith and a second portion of its top wall extending to adjacent said last-named side wall of the food-storage chamber; a perforate storage platform above said second portion; and a second door near the front wall of the food-storage chamber and extending, when closed, between said vertical wall of the cooling unit and said last-named side wall of the food-storage chamber, said food-storage container being cooled mainly by direct convectional air currents flowing downwardly from said cooling unit including said two refrigerated walls thereof.

WILLIAM B. ANDERSON.